United States Patent
Venca et al.

(10) Patent No.: US 7,035,028 B2
(45) Date of Patent: Apr. 25, 2006

(54) DISK DRIVE WRITE DRIVER WITH BOOSTING CIRCUIT TO IMPROVE OUTPUT VOLTAGE SWING

(75) Inventors: Alessandro Venca, Tortona (IT); Roberto Alini, Dublin, CA (US); Baris Posat, Burlingame, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/843,823

(22) Filed: May 12, 2004

(65) Prior Publication Data

US 2005/0254159 A1    Nov. 17, 2005

(51) Int. Cl.
G11B 5/09    (2006.01)

(52) U.S. Cl. .................... 360/46; 360/66; 360/68; 327/110

(58) Field of Classification Search ........... 327/110, 327/424, 448, 508, 588; 360/65–68
See application file for complete search history.

(56) References Cited

U.S. PATENT DOCUMENTS

| 5,581,455 | A | * | 12/1996 | Rossi et al. ............... 363/60 |
| 5,612,828 | A | * | 3/1997 | Brannon et al. ........... 360/46 |
| 5,914,867 | A | * | 6/1999 | Pascucci .................... 363/60 |
| 5,952,851 | A | * | 9/1999 | Yuen ......................... 326/88 |
| 6,166,869 | A | | 12/2000 | Pidutti et al. |
| 6,204,654 | B1 | * | 3/2001 | Miranda et al. ........... 323/316 |
| 6,236,246 | B1 | | 5/2001 | Leighton et al. |
| 6,307,695 | B1 | * | 10/2001 | Bhandari ................... 360/46 |
| 6,512,645 | B1 | * | 1/2003 | Patti et al. ................. 360/46 |
| 6,512,646 | B1 | | 1/2003 | Leighton et al. |
| 6,671,113 | B1 | * | 12/2003 | Klaassen et al. ........... 360/46 |
| 6,831,800 | B1 | * | 12/2004 | Ranmuthu ................. 360/68 |
| 6,879,455 | B1 | * | 4/2005 | Ngo et al. .................. 360/68 |
| 6,885,225 | B1 | * | 4/2005 | Ohmichi et al. ........... 327/112 |
| 2002/0186578 | A1 | | 12/2002 | Kim |
| 2003/0081339 | A1 | | 5/2003 | Barnett ....................... 360/67 |
| 2003/0090828 | A1 | | 5/2003 | Venca ........................ 360/61 |
| 2003/0189447 | A1 | | 10/2003 | Price ......................... 327/110 |
| 2003/0234996 | A1 | * | 12/2003 | Ngo ........................... 360/46 |
| 2004/0032684 | A1 | | 2/2004 | Leighton et al. |
| 2004/0196582 | A1 | * | 10/2004 | VanEaton et al. .......... 360/46 |

FOREIGN PATENT DOCUMENTS

EP    1 083 550 A2    3/2001
EP    1 376 542 A2    2/2004

* cited by examiner

*Primary Examiner*—David Hudspeth
*Assistant Examiner*—Dismery Mercedes
(74) *Attorney, Agent, or Firm*—Lisa K. Jorgenson; William J. Kubida (57) ABSTRACT

A write driver driving a write current through a head connected to the write head by an interconnect. The write driver includes a circuit matching output resistance to the odd characteristic impedance of the interconnect and a voltage boosting circuit. The voltage boosting circuit in connected between a high voltage reference or supply voltage and a low voltage reference, and includes a current source, such as a MOS transistor, connected to the input node of a capacitor. During the overshoot duration, the current source operates at saturation to generate a pulsed current with an amplitude of half the load current. The circuit includes another transistor in series with the current generator between the capacitor and the driver output. A forward bias diode is connected between the capacitor output node and high voltage reference and enters reverse bias during overshoot duration swinging the driver output voltage above supply voltage.

19 Claims, 9 Drawing Sheets

(THEORETICAL IDEAL)

FIG.1

PRIOR ART

DISK DRIVE WRITE DRIVER WITH BOOSTING CIRCUIT TO IMPROVE OUTPUT VOLTAGE SWING

BACKGROUND OF THE INVENTION

1. Field of the Invention

The present invention relates, in general, to hard disk drive (HDD) systems and magneto resistive data storage devices and systems, and, more particularly, to a write driver with a circuit, and associated method, for HDD applications capable of switching a current into a write head, such as a low impedance head, connected to the write driver through a transmission line or interconnect. The write driver circuit includes a boosting device or circuit to increase the output voltage launched into the transmission line while maintaining impedance matching between the write driver and the characteristic impedance of the transmission line.

2. Relevant Background

The demand for improved data storage techniques and systems continues to rapidly grow. Hard disk drives utilizing magneto resistive (MR) heads to read and write data onto one or more spinning magnetic platters or disks are one of the more important and wide spread devices in the data storage industry. Hard disk drives may be used in many applications, including enterprise computer systems, personal computers, set top boxes, audio, video, or television applications, and many other large and small computer devices. Many applications are still being developed, and the uses for hard disk drives are expected to increase.

Hard disk drives store binary encoded information as regions of magnetic flux on a media having a magnetic surface coating. It is desirable that these magnetic regions be encoded on the disk as densely as practical, so that a maximum amount of information may be stored. Disk and tape drive suppliers continue to increase areal densities, or the number of data bits per square inch, to meet the increasing demand for storage at competitive pricing. However, increasing areal density requires the write mechanism to produce smaller recorded patterns on the disk. Write head design and write driver design are key technologies needed to achieve these capacity increases.

The magnetic regions are created by passing current through a coil of a magnetic write head. Binary data can be encoded by switching the polarity of the current through a coil in the write head. The current in the write head coil is provided by a circuit in a write driver that is connected to the coil through a flexible transmission interconnect. The data rate (i.e., the rate at which bits can be written onto the media) is determined largely by the rate at which the current can be switched in the write head driver circuit. It is desirable to have a write driver circuit that quickly switches current to the desired polarity and magnitude to support high disk rotation speeds with small magnetic regions. Also, the driver circuit must raise the current amplitude to a level sufficient to ensure the flux generated by the write coil is adequate to saturate the magnetic media while limiting the current below levels that will result in "blooming" of the written magnetic region into adjacent regions of the media.

A conventional write driver circuit comprises an H-bridge configuration using four switches. In an H-bridge circuit, one leg of the bridge is always trying to drive current into the inductive load. In other words, the H-bridge is always coupling the power supply voltage onto one of the inductor nodes and ground to the other inductor node by appropriately activating the bridge switches. While there have been many improvements to conventional write driver circuits to enhance their performance, there are demands for improved performance. For example, many switching write driver circuits still are unable to achieve impedance matching to transmission interconnects and the lack of impedance matching results in pattern dependent distortion which limits the performance of the write circuitry. There are also continuing issues with the power required to operate or drive the write head with the write driver, and specifically, there is an increasing demand to launch output power into the transmission interconnect that is boosted relative to power levels supplied to the write driver.

Figure 1:
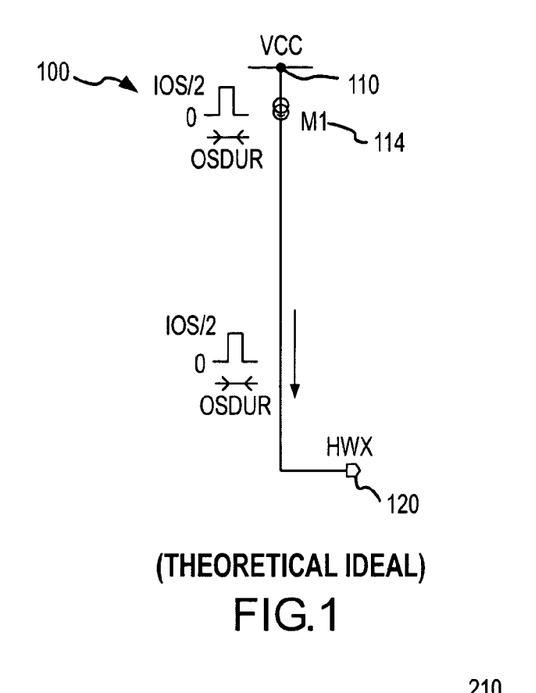
FIG. 1 illustrates a theoretical ideal circuit for producing a desired pulsed current at the output node of a write driver.

FIG. 1 illustrates a theoretical ideal circuit 100 for use in a write driver that functions to produce a current pulse at the driver output node 120 or HWX node for the overshoot duration, OSDUR, with an amplitude, IOS/2. In the ideal circuit 100, the current pulse is generated by an ideal current source 114 that has an infinite output impedance that is independent of the value of the output voltage at node 120 (or output node HWX). As a result, the output dynamic range of the ideal circuit 100 is infinite. Of course, the ideal circuit 100 cannot be reproduced in manufactured write driver circuits.

Figure 2:
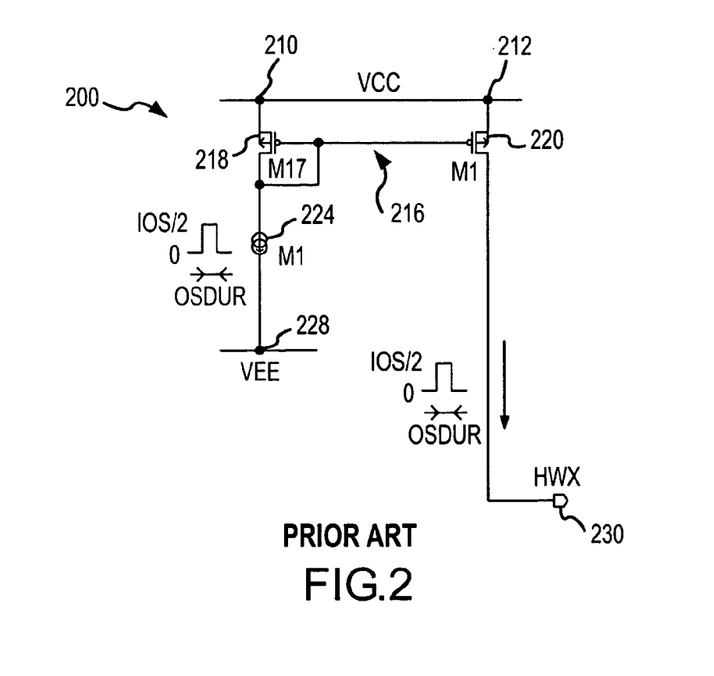
FIG. 2 illustrates an exemplary prior art circuit implemented to produce a pulsed current at an output node of a write driver.

A variety of circuit designs have been used in write heads to effectively provide the desired pulsed current at the write driver output. FIG. 2 illustrates one commonly implemented write driver circuit 200 for delivering a current pulse to a write driver output node 230. As shown, the current pulse is delivered to the output node 230 through the use of transistors 218, 220, e.g., metal-oxide semiconductor (MOS) transistors, configured as current mirror 216. A high reference or input voltage, VCC, is applied on nodes 210, 212 and a low reference voltage, VEE, on node 228, and a current source 224 is provided between node 228 and transistor 218 of the current mirror 216. In practice, the output impedance of transistor 220 (or transistor M1) is high as long as the transistor 220 works in the saturation region, and the output impedance becomes low when the transistor 220 enters the triode region of operation. The output dynamic range of the circuit 200 is equal to the supply voltage, VCC, less the overdrive voltage, $VOV_{M1}$, of transistor 220. The amplitude of the current pulse delivered by the source 224 to a load connected to the output node 230 is IOS/2 for output voltages at the HWX or output node 230 within the output dynamic range. Unfortunately, the amplitude of the current pulse produced by the write circuit 200 at output node 230 decreases for output voltages at the output node 230 reaching or exceeding the output dynamic range.

Hence, a need exists for a circuit for driving write heads in a hard disk drive (HDD) system that more effectively provides a current pulse with a desired amplitude, such as IOS/2, for the duration of the overshoot, OSDUR. Preferably, such an improved circuit would control propagation of reflection from the write head or load by matching the impedance of the write driver circuit with the impedance of interconnects with the write head.

SUMMARY OF THE INVENTION

The present invention addresses the above problems by providing a method and associated circuitry or components for selectively driving a write current through a write head of a hard disk drive assembly with an enhanced output dynamic range or with driver output voltage that is greater than the supply voltage. Additionally, the write driver of the present invention is configured to operate with little or no propagation of reflected waves from the write head. One feature of the write driver of the present invention is a boosting technique that supplies pulsed current with an amplitude of one half the load current to the driver output node through a capacitor rather than directly through a current generating transmitter connected directly to the output node. The capacitor is preferably pre-charged, such as with a low reference voltage through a switch that closes after the termination of an overshoot transient.

More particularly, a write driver circuit is provided for driving current through a write head in a hard disk system. The driver circuit is adapted to provide an improved voltage swing, with the output voltage exceeding the supply voltage or high reference voltage during at least a portion of the overshoot transient. The write driver circuit includes an output node connected to the interconnect and upon which the output voltage of the circuit is launched, and nodes are provided for receiving a supply voltage. The write driver circuit includes a current generator connected to the supply voltage nodes and operates to generate a pulsed current for a duration equal to the overshoot duration and with an amplitude of half the write head current or load current. A capacitance device, such as a capacitor, is connected to the current generator output such that the pulsed current flows through the capacitance device prior to reaching the driver output node.

According to one aspect of the invention, the capacitance device is typically selected to be large enough to avoid saturation of the current generator, which is often a MOS transistor that may be in current mirror configuration, during the overshoot duration. The write driver circuit typically further includes a transistor, such as a transistor receiving a bias voltage from a voltage source, connected in series with the current generator and to the output of the capacitor.

DETAILED DESCRIPTION OF THE PREFERRED EMBODIMENTS

Briefly, the present invention is directed to a method, and associated circuitry and devices for switching current into a write head in a hard disk drive (HDD) system with improved control over the delivery of a pulsed current at the output and control over propagation of reflections from the write head. In one embodiment, a write driver is provided that includes a circuit for maintaining impedance matching with the characteristic impedance of a transmission line connecting the write driver to the write head. The write driver also includes a circuit for providing a boosting technique to increase the output voltage launched into the transmission line which enables the write driver to more effectively produce a current pulse for the duration of an overshoot, OSDUR, of a write assembly of the HDD system and with a desired amplitude, i.e., IOS/2, at the output node, HWX (and, typically, HWY), of the write driver.

To explain, these and other features of the invention a HDD system implementing the invention will first be described with an overview discussion of the boosting technique with reference to FIG. 3. Then, one embodiment of a voltage boosting circuit is described in detail with reference to FIG. 4 followed by a description of a simplified write assembly for a HDD system implementing such a boosting circuit with reference to FIG. 5. A detailed H-bridge implementation of a write driver is then discussed with reference to FIG. 6 followed by a timing diagram for exemplary write circuits implemented according to the invention. FIGS. 7–10B are provided to further illustrate the differences between exemplary prior write driver circuits and the write circuits of the invention and to illustrate some of the advantages of the inventive circuits.

Figure 3:
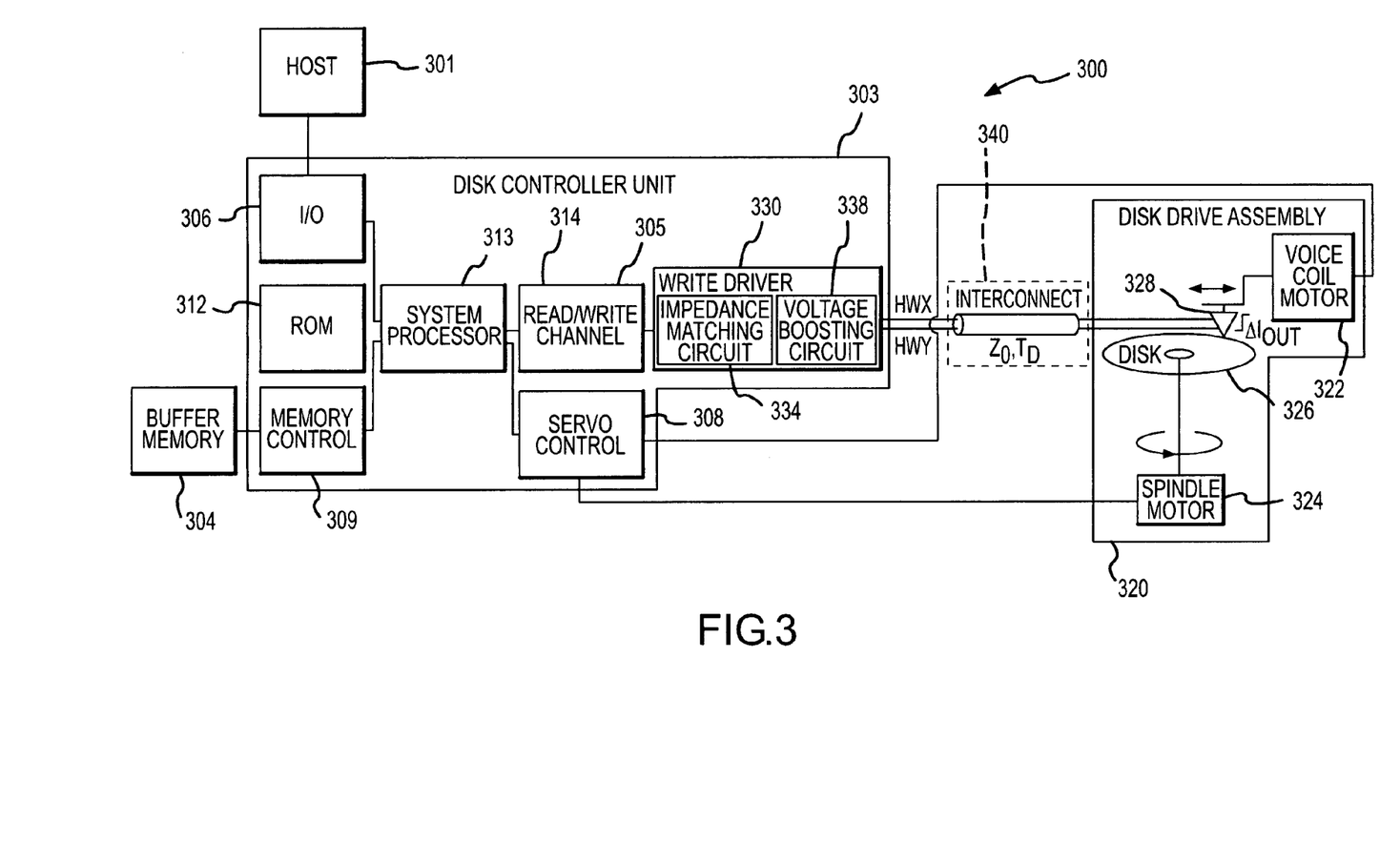
FIG. 3 illustrates in block diagram form a hard disk drive (HDD) system with a write driver comprising an impedance matching circuit or devices and a voltage boosting circuit according to the present invention.

FIG. 3 illustrates in simplified form a hard disk drive system 300 in which the present invention is embodied but it should be understood that the boosting technique and impedance matching features of the invention can be used in most hard disk drive assemblies that utilize an impedance head 328 linked via an interconnect 340 to a write driver 330 and are not limited to use in the system illustrated. As shown, disk drive system 300 includes a system processor 313 processing requests and commands from a host computer 301 that directs drive system 300 to perform specific behavior involving disk drive assembly 320. Examples include reading and writing data to disk drive assembly 320, providing state information such as defect tables, error status, and the like. Disk controller unit 303 includes data processing capacity as well as memory in the form of ROM 312 and buffer memory 304 to generate responses to received commands and requests as controlled by memory control 309. The generated responses return data, state information, and/or error codes depending on the particular operation being performed.

Disk drive system 300 implements physical mass storage typically on a plurality of magnetic disks and read/write head electronics for transferring data with the disks. As shown, disk drive system 300 includes read channel hardware for preprocessing and amplifying data read from the magnetic media as well as a spin motor for spinning the disks, and voice coil motor (VCM) for positioning the read/write head electronics at specific locations with respect to the disk surface(s). Servo control 308 generates drive signals that control the VCM 322 and/or spindle motor 324. These drive signals are in the form of precision higher power signals that drive the motors directly.

Host 301 typically comprises a data processing device such as a personal computer, server, workstation or the like that requires access to bulk data storage capabilities of disk drive assembly 320. Host 301 sends write commands and data via controller 303 to write data onto the disk(s) 326 as well as read commands to retrieve previously written data from disks within disk drive assembly 320. The read and write commands are provided via the read/write channel 305. On both read and write operations, the data transmitted from the host 301 to the disk controller 303 includes an indication of a specific location or set of locations on the disk drive assembly 320 that contains the data that is to be accessed.

The data that is exchanged through disk controller 303 is typically buffered in buffer memory 304 that is accessible via memory controller 309 and subsequently transmitted to disk assembly 320 or host 301. Buffer memory 304 is used to overcome differences between the speed at which host 301 operates as compared to the speed at which disk assembly 320 operates. In place of or in addition to buffer memory 304, a cache memory may be implemented by appropriate changes (e.g., tag management, hit/miss detection, and the like) to memory controller 309. Servo control 308 regulates the spin speed of spindle motor 324 in response to commands from system processor 313. Although a head position control unit is often provided, the servo control 308 is shown to operate, e.g., through a voltage mode driver (not shown), to deliver controlled voltage signals in response to commands from system processor 313 to voice coil motor 322. These voltage signals cause voice coil motor unit 322 to move read/write head 328 into precision alignment with respect to the surfaces of disk 326.

Read/write channel circuit 305 communicates data and control information with the surface of disk 326. Control information such as servo control data, phase lock oscillator synchronization patterns, and servo bursts are encoded into portions of disk 326. This information is provided through read/write channel circuit 305 to system processor 313. System processor 313 uses this information to compute commands for servo control 308.

The read/write head 328 comprises an MR head that is used to both record user data to and read user data back from the disk 326. Recording data or writing by the head 328 is controlled in part by the write driver 330 that functions to drive a current through a coil in the head. In this regard, the write driver 330 of the system 300 is configured according to the invention to include a voltage boosting circuit 338 that launches an output voltage into the interconnect 340 and a pulsed current is transmitted over a transmission line of interconnect 340 to the head 328. To control propagation of reflected waves from the head 328, the write driver 330 also is shown to include an impedance matching circuit 334 to better illustrate the concept of matching impedance of the write driver 330 to the impedance of the interconnect 340. In practice, the circuit 334 may be one or more components, such as an output resistor of the driver 330, with the important aspect being that the write driver 330 includes one or more components that set the write driver 330 output impedance to the odd characteristic impedance of the interconnect 340 (where $Z_{ODD}=Z_O/2$).

As will be explained in detail with reference to FIGS. 4–10B, the voltage boosting circuit 338 and other circuitry of the write driver 330 are preferably adapted to significantly enhance the achieved output voltage swing for the driver 330 relative to prior write driver devices to achieve a desired output step current, $\Delta I_{OUT}$ in the head 328. The output resistance of the write driver 330 is set to $R_{OUT}$ which is set to $Z_{ODD}$. The output voltage of the driver 330 is supplied to the interconnect 340 at output nodes HWX and HWY for a typical two-directional or switched write driver implementation. As is explained in detail below, the write driver 330 utilizes the voltage boosting circuit 338 to achieve the following:

$$\text{Output Voltage Swing}=V_{HWX}-V_{HWY}=\Delta I_{OUT} Z_{O/} 2 > \text{Supply Voltage, VDD}$$

Figure 4:
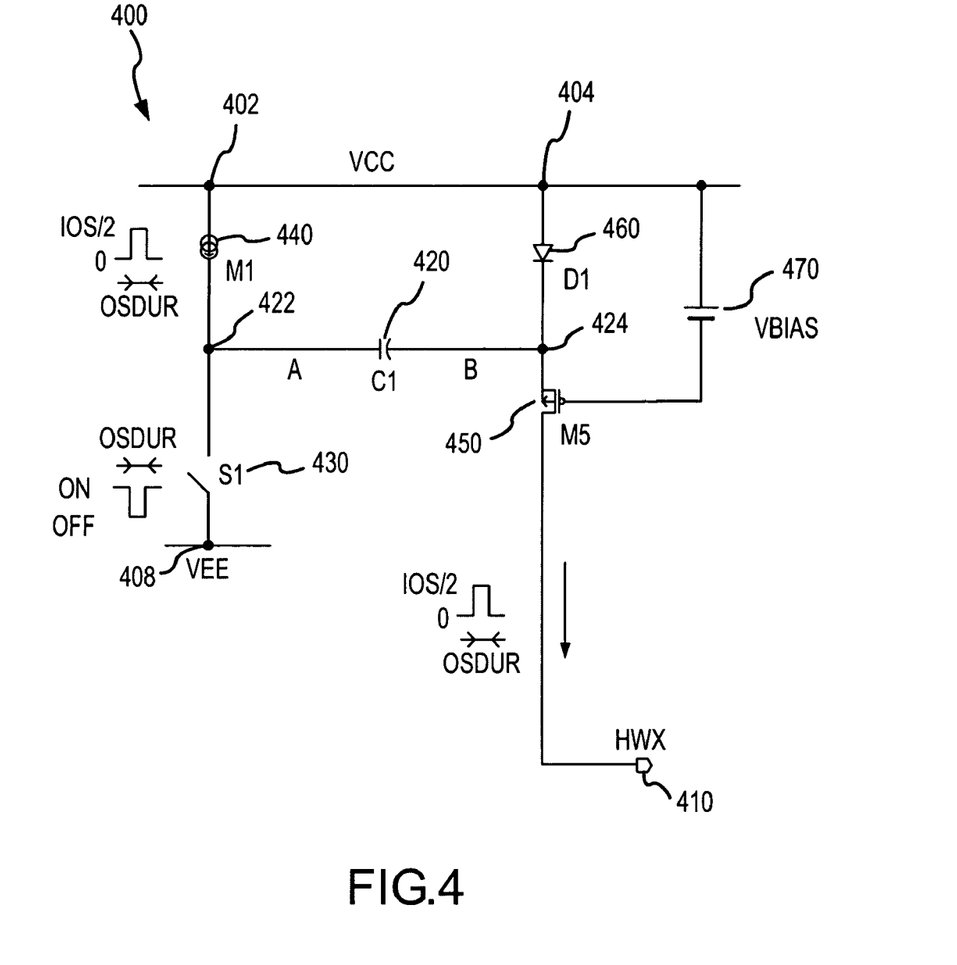
FIG. 4 illustrates, in a fashion similar to FIGS. 1 and 2, one embodiment of a boosting circuit according to the invention for use in a write driver of a HDD system, such as the HDD system of FIG. 3.

One embodiment of a boosting circuit 400 is illustrated in FIG. 4. As shown, a current generator 440 is connected between a high reference or supply voltage, VCC, at nodes 402, 404 and a low reference voltage, VEE, at node 408. The boosting circuit 400 further comprises a capacitor 420 connected to the current generator 440 via input node 422 and connected to an output node 410 (or HWX node) via output node 424. The low reference voltage, VEE, is provided to the circuit 400 selectively through switch 430 that is connected to the capacitor input at node 422. The boosting circuit 400 further includes a diode 460 between nodes 404 and 424 and a transistor 450 (labeled M5) between node 424 and driver output node 410 that driven by voltage source 470 providing a bias voltage, VBIAS.

When compared with the circuit 200 of FIG. 2, one differing feature is that the boosting circuit 400 includes the capacitor 420 in addition to current generator 440. As a result, the boosting circuit 400 is able to supply a pulsed current, IOS/2, to the output or HWX node 410 through a capacitor 420 (labeled "C1"). In circuit 200 in contrast, the current generator 220 (labeled "M1") is connected directly to the output node 230. As a consequence, the output voltage dynamic range of the boosting circuit 400 is improved because the inlet node 422 of the capacitor 420 can be pre-charged as low as low reference voltage, VEE, through the switch 430.

When the capacitor 420 is selected to be large enough, the voltage integration at node 422 is slow enough to avoid the saturation of the current generator 440 during the entire overshoot duration, OSDUR. During operation, transistor 450 eventually enters triode condition during the overshoot transition without affecting the output impedance of the boosting circuit 400 since the transistor 450 is in series with the high output impedance of the current generator 440.

Diode 460 is provided in the circuit 400 to allow capacitor node 424, and hence, the output voltage at driver output node 410, to swing above the supply voltage, VCC, without affecting the output impedance and without changing the current pulse amplitude delivered to the load (i.e., a head not shown in FIG. 4) by current generator 440 through output node 410. In the ideal limit case where the capacitor 420 has a very large capacitance, the output node 410 can have, before the transistor 440 will enter triode condition and lower the output impedance of the circuit 400, a voltage swing as high as:

$$\text{Output Dynamic Range or Voltage Swing}=3VCC-V_{DIODE}-VOV_{M1}$$

where $VOV_{M1}$ is the overdrive voltage of transistor 440, VDIODE is a forward bias diode voltage, the transistor 440 is a MOS transistor in current mirror configuration, where VEE=–VCC, and where the ohmic drop on the transistor 450 is neglected.

Practical area constraints and speed limitations due to the parasitics of the capacitor 420 will bound or limit the size of the capacitor 420 such that the voltage integration at capacitor input node 422 will be fast enough to lower the output voltage swing obtainable with respect to the ideal case described above. The output dynamic range in this more practical case is:

$$\text{Output Dynamic Range} = 3VCC - V_{DIODE} - VOV_{M1} - (IOS \cdot OSDUR)/2C1 \quad \text{(EQ. 1)}$$

The improvement in the dynamic range relevant to the circuit 200 shown in FIG. 2 can be determined by the following:

$$\text{Enhancement in Dynamic Range} = 2VCC - V_{DIODE} - (IOS \cdot OSDUR)/2C1 \quad \text{(EQ. 2)}$$

Figure 5:
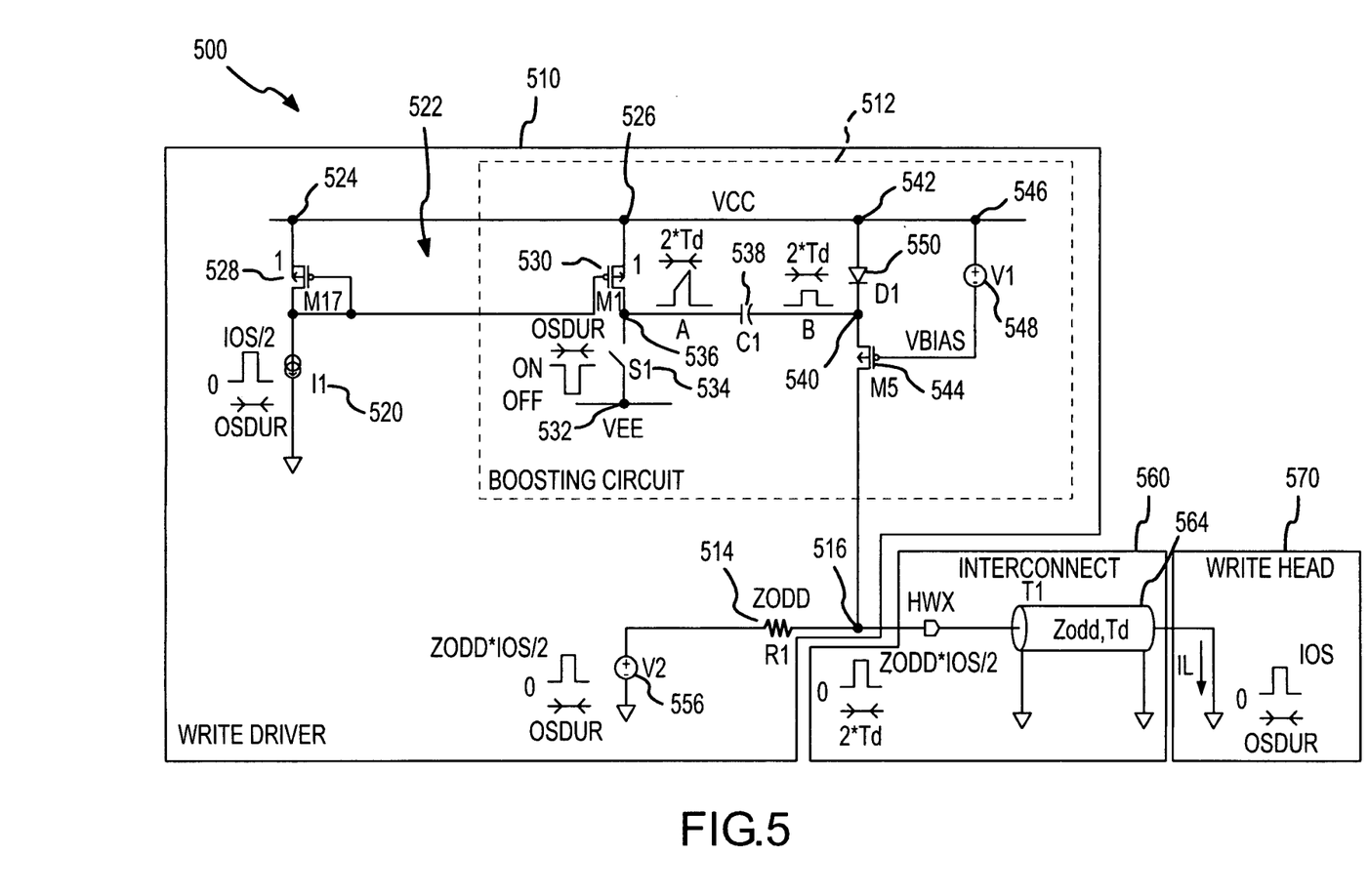
FIG. 5 is another illustration of a write assembly according to the present invention providing a more detailed schematic illustration of the circuitry of the write driver with a boosting circuit and with matched impedance.

The boosting techniques taught by the circuit 400 can be successfully implemented in a write driver circuit for use in HDD applications. In particular, the boosting techniques of the invention can be used to improve the dynamic performances of the pull-up and pull-down circuits of such drivers. Pull-up and pull-down circuits of a write driver incorporating the boosting techniques can be implemented in many different ways. FIG. 5 shows one example of a write assembly 500 with a write driver 510 linked to a write head or load 570 via an interconnect 560. The write driver 510 is shown to includes a pull-up circuit and described below but, of course, the exemplary pull-up circuit can be utilized by those skilled in the art to obtain a similar pull-down circuit making use of complementary devices as is shown the write assembly 600 of FIG. 6 (e.g., PMOS replaced with NMOS transistors and vice versa).

As shown, the write driver 510 includes a boosting circuit 512 linked to a current mirror 522 including transistors 528, 530 fed by reference current generator 520. The boosting circuit 512 is also connected to the driver output node 516, which in turn is linked to an impedance matching circuit comprising voltage generator 556 and output resistor 514. To provide impedance matching with the interconnect 560 which has a transmission line 564 with an odd characteristic impedance, $Z_{ODD}$, the resistor 514 is selected to have a resistance, R1, equal to the odd characteristic impedance, $Z_{ODD}$, Of the interconnect line 564. The boosting circuit 512 is connected to a high reference or supply voltage, VCC and a low reference voltage, VEE, at nodes 526, 542, 546, and 532. The circuit 512 includes a transistor 530 (part of the current mirror 522) that functions as a current generator. Significantly, a capacitor 538 is provided in the circuit 512 and is connected to the source 530 at node 536 and to the output node 516 via node 540. The boosting circuit 512 also includes diode 550 between nodes 540 and 542, transistor 544, and voltage generator 548 providing a bias voltage, VBIAS, to the transistor 544.

During operation of the write assembly 500, the transistor 530 in the boosting circuit 512 acts like a pulsed current generator. The amplitude, IOS/2, of the pulsed current generated by the transistor 530 is set by the reference current generator 520 and by the ratio (M1:Ml7) of the current mirror 522, which may be set to one for simplicity. The duration, OSDUR, of the generated current pulse sets the overshoot duration of the load current, IL, at the write head 570. During the overshoot duration, OSDUR, the current generated by the transistor 530 flows through the capacitor 538, the transistor 544, and the transmission line 564 of the interconnect 560 to the head or load 570 (shown as a short for simplicity). The current, IL, in the load or head is double the amplitude, IOS/2, generated by the transistor 530 at the output node 516 of the write driver 510. The beneficial doubling of the load current, IL, is achieved due to a "current amplification" produced by the write driver 510 circuitry, which is explained in greater detail in U.S. patent application published May 15, 2003 entitled "Write Head Driver Circuit and Method for Writing to a Memory Disk" to Venca et al., Publication No. U.S. 2003/0090828 A1, Ser. No. 09/991,557, which is incorporated herein in its entirety by reference. The switch 534 is open during the overshoot duration, OSDUR.

The reference or bias voltage generator 548 provides a bias voltage, VBIAS, so that the transistor 544 is at or near the limit of conduction before the overshoot transition occurs avoiding to waste part of the output voltage dynamic range to turn on transistor 544 and also increasing the switching speed since the parasitics are pre-charged at capacitor node 540. The driver output resistor 514 sets the driver circuit 510 output impedance and is chosen such that its resistance, R1, is equal to $Z_{ODD}$, where $Z_{ODD} = ZO/2$ is the odd characteristic impedance of the interconnect transmission line 564. A second reference voltage generator 556 generates a voltage pulse, V2, with a duration equal to the overshoot duration, OSDUR, and with an amplitude equal to the output voltage, $V_{HWX}$, on node 516. As a result, the voltage drop across resistor 514 is made equal to zero, which avoids any part of the current coming from the boosting circuit 512 or pull-up branch to flow through internal resistor 514.

The output voltage, $V_{HWX}$, swings from 0 Volts to $Z_{ODD} \cdot IOS/2$ Volts for a period equal to $2T_D$, where $T_D$ is the propagation delay of the interconnect 560. The output voltage, $V_{HWX}$, eventually forces transistor 544 in triode for high output current amplitude, IOS/2, settings. The output impedance of the overshoot branch nevertheless remains high compared to the odd characteristic impedance, $Z_{ODD}$, of the interconnect 560 because transistor 530 is still in saturation. Diode 550 eventually enters reverse bias allowing capacitor node 540 and output voltage, $V_{HWX}$, at driver output node 516 to swing above the supply voltage, VCC, up to the limit given in Equation 1. After the overshoot transient has ended, switch 534 closes so that the capacitor 538 (through switch 534) and diode 550 can be re-charged to a voltage equal to twice the supply voltage less the voltage of the diode 550 (i.e., $2VCC - V_{DIODE}$). The capacitor 538 is then ready for the next transition of the write assembly 500.

Figure 6:
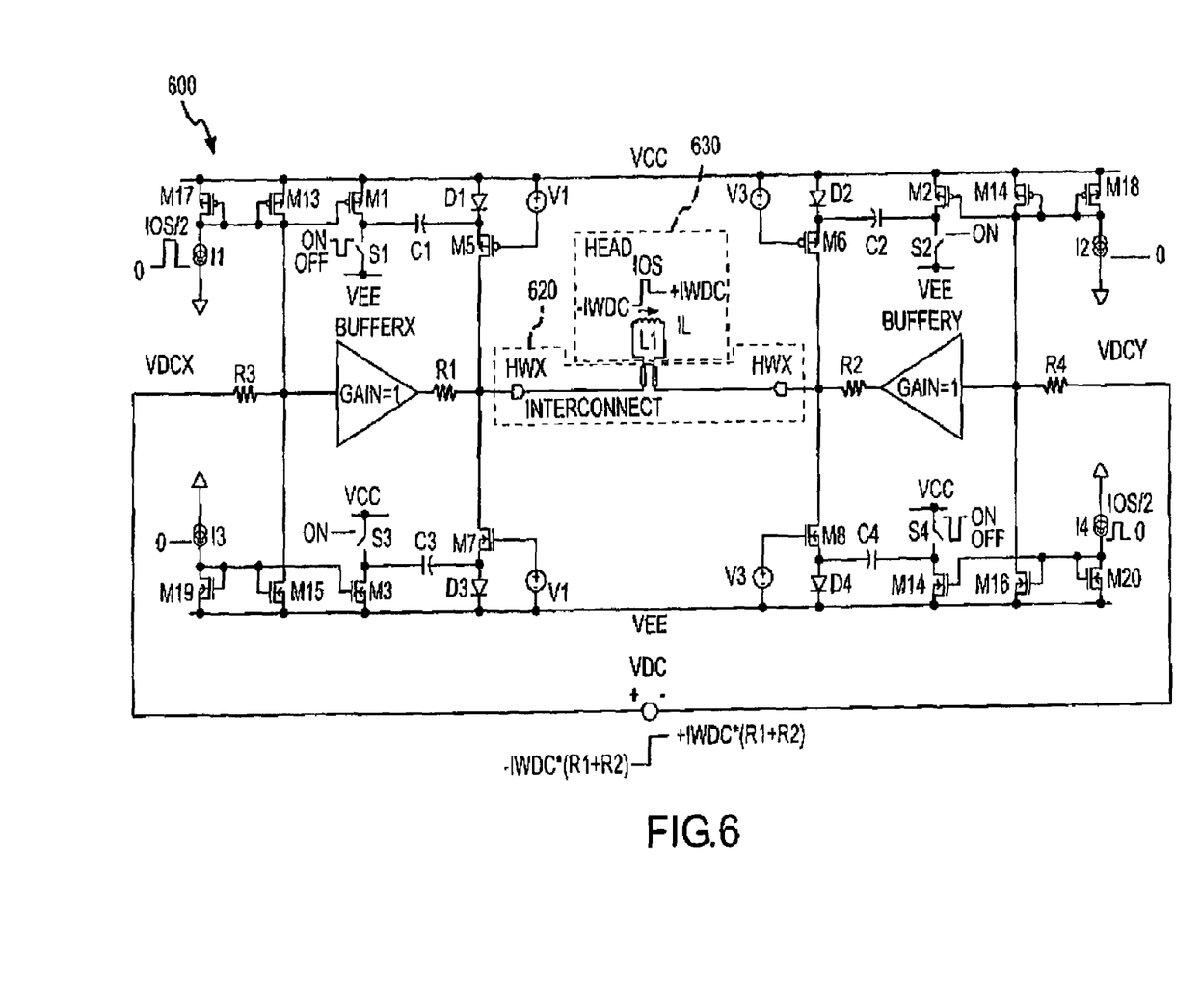
FIG. 6 illustrates an exemplary circuital implementation of a write assembly of the present invention utilizing an H-bridge write driver.

FIG. 6 illustrates a write assembly 600 implementing the write driver techniques of FIG. 5 to provide a fully differential circuital implementation of a write driver with a pull-up circuit and a pull-down circuit for selectively driving pulsed current through an interconnect 620 and a write head 630. Each of the two symmetrical sides of the write circuit in assembly 600 comprise two of the basic cells or circuits described earlier, such as write driver 510 in FIG. 5, to implement the pull-up and pull-down boosted overshoot transient. The pull-down overshoot circuit is built making use of complimentary devices with respect to the pull-up overshoot circuit, e.g., with PMOS transistors replaced with NMOS transistors and vice versa. With the components and general functioning of boosting circuits and write drivers including such boosting circuits understood with reference to the devices of FIGS. 3–5, it may be helpful to discuss the components and circuitry of the write driver circuit of assembly 600 with respect to its operation.

During the positive overshoot transition (i.e., overshoot current flowing from node HWX to node HWY), Buffer X, transistor M13, and resistor R3 generate at the output of Buffer X a voltage equal to the output voltage, $V_{HWX}$, while Buffer Y, transistor M16, and resistor R4 generate at the output of Buffer Y a voltage equal to the output voltage, $V_{HWY}$. As a result, the voltage drop across resistors R1 and R2 are made equal to zero avoiding any part of the current IOS/2 coming from the overshoot branches to flow through the internal resistors R1 and R2. Buffers X and Y in one embodiment are designed to have unity gain and low output impedance and high input impedance compared to the odd characteristic impedance, $Z_{ODD}$, of the interconnect 620. During the negative overshoot transition (i.e., overshoot current flowing from node HWY to node HWX), Buffer X, transistor M15, and resistor R3 generate at the output of Buffer X a voltage equal to the output voltage, $V_{HWX}$. Buffer Y, transistor M14, and resistor R4 generate at the output of Buffer Y a voltage equal to the output voltage, $V_{HWY}$. The steady state current, IWDC, into the coil, L1, of head 630 is set by a differential switched controlled voltage source (i.e., VDC=IWDC·$Z_{ODD}$) connected at the nodes VDCX, VDCY as shown in FIG. 6.

An analysis of the write driver circuit of write assembly 600 can begin with Equation 1, with the differential output dynamic of the write driver being rewritten independent of the output current as:

Diff. Output Dynamic Range=2((3$VCC$-$V_{DIODE}$-$VOV_{M1}$)/(1·($OSDUR/(C1·Z_{ODD})$))))

where $V_{DIODE}$ is a forward bias diode voltage, $VOV_{M1}$ is the overdrive voltage of transistors M1, M4, and where VEE is considered equal to the negative of VCC, and where the ohmic drop on transistors M5, M8 is neglected.

Figure 7:
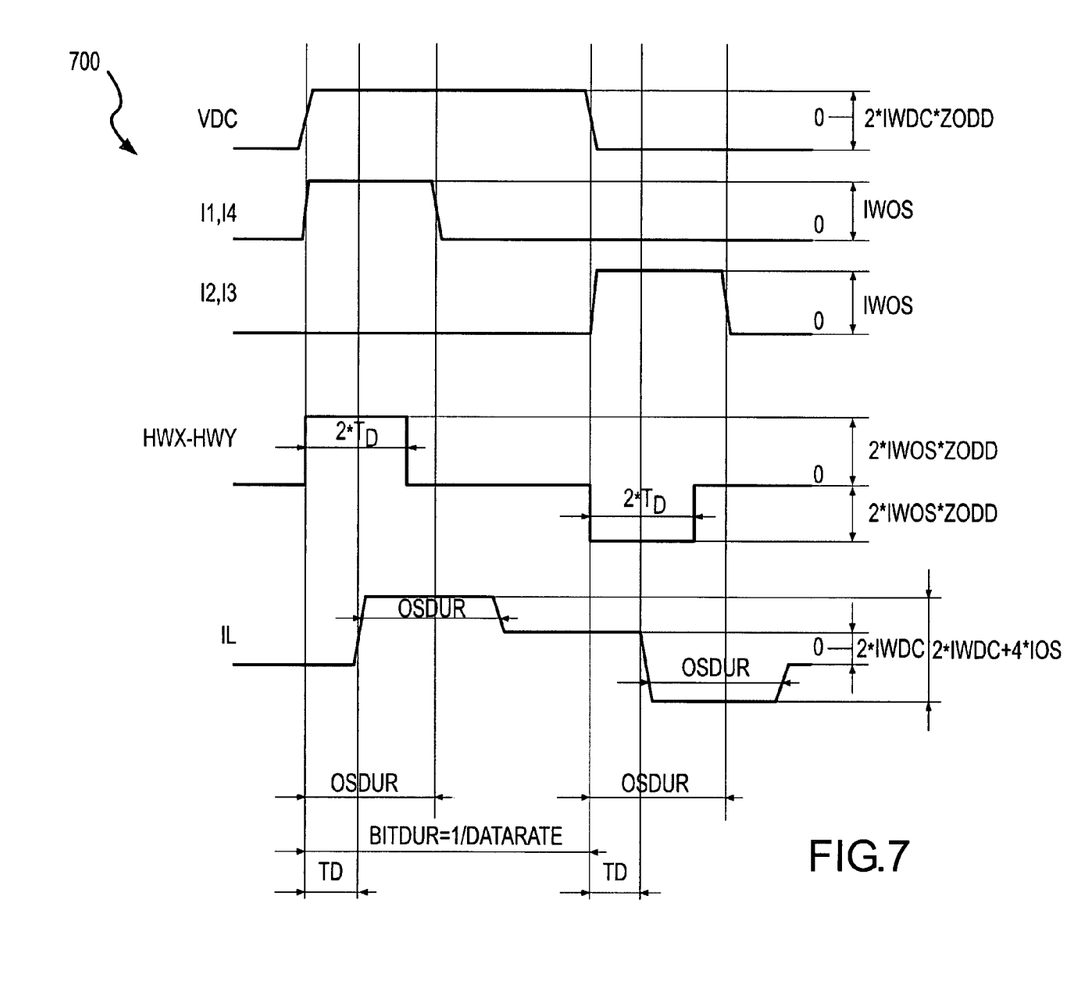
FIG. 7 is a time diagram for the write driver of FIG. 6.

FIG. 7 illustrates a time diagram 700 for the write driver of the write assembly 600 of FIG. 6. The time diagram 700 shows the control signals, the write driver differential output signal (i.e., HWX–HWY), and the head current, IL, when a sequence of one positive and one negative pulse are driven at the full data rate (i.e., BITDUR=1/DataRate). For the illustrated case, the duration of the current pulse generated by I1–I4 (which sets the duration, OSDUR, of the overshoot in the head current) is set longer than $2T_D$, where $T_D$ is the electrical length of the interconnect 620. The main reflection generated at the head side at a time $T_D$ seconds after the beginning of the transition is completely absorbed by the matched write driver at a time of $2T_D$ seconds, and no other reflections propagate after $2T_D$ seconds with the result of producing a clean head current step response. Further, in general, since the write driver of the write assembly 600 in FIG. 6 is impedance matched with the interconnect 620 at any time, the overshoot duration, OSDUR, can be set to any value from zero seconds to BITDUR seconds.

Figure 8:
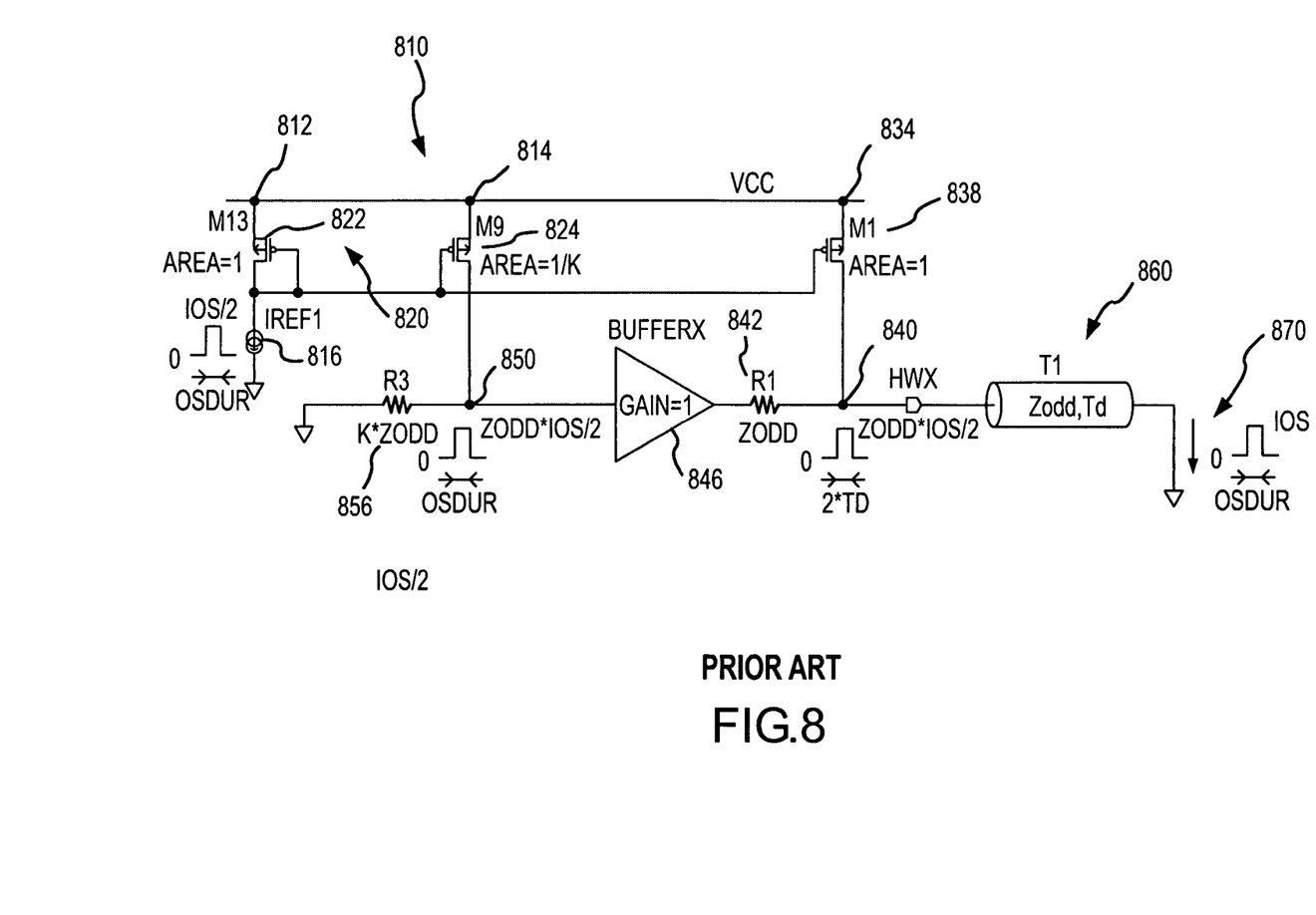
FIG. 8 is a prior art write circuit utilized to drive a low impedance load or write head.
Figure 9A:
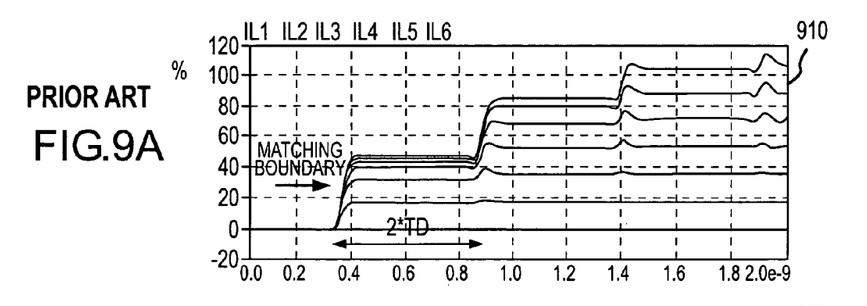
FIG. 9 provides a set of graphs illustrating load currents and output voltages typically achieved with the prior art circuit of FIG. 8 and with the write driver of the present invention as shown in the embodiment of FIG. 5.
Figure 9B:
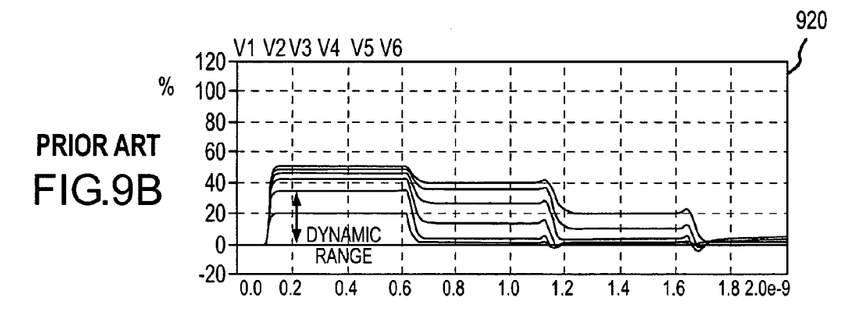
Figure 9C:
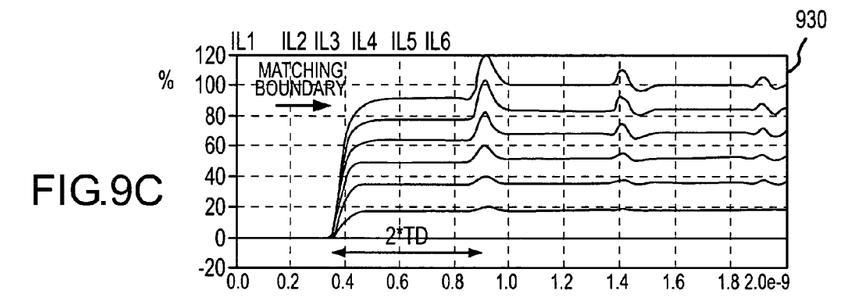
Figure 9D:
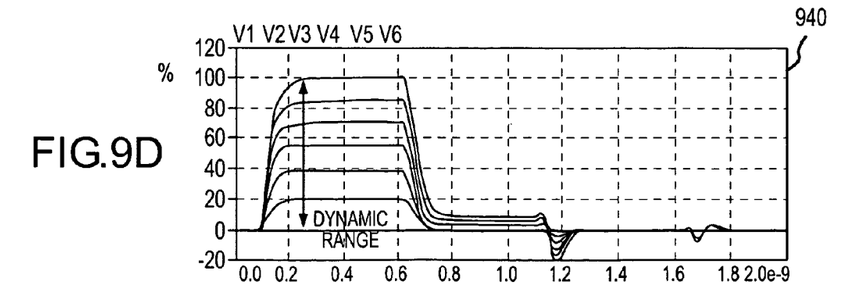

FIG. 8 illustrates in a simplified manner a write driver 810 taught by U.S. patent application published May 15, 2003 entitled "Write Head Driver Circuit and Method for Writing to a Memory Disk" to Venca et al., Publication No. U.S. 2003/0090828 A1, Ser. No. 09/991,557, which is incorporated herein in its entirety by reference. The write driver 810 is illustrated in a manner that allows ready comparison with the write 510 of the present invention shown in FIG. 5. The write driver 810 is used to provide an output voltage and pulsed current on driver output node 840 which is connected to interconnect 860 to provide current, IOS, to load or head 870. The write driver 810 includes internal resistor 842 with resistance R1 set to $Z_{ODD}$ to control reflection. Driver 810 applies a supply voltage, VCC, at nodes 812, 814, 834 to supply current mirror 820 (and transistors 822, 824) and transistor 838. A reference current source 816 is connected to the current mirror 820, and the current mirror is connected to an input node 850 of a buffer 846 having unity gain. An additional resistor 856 is provided in a branch off of buffer input node 850 with a resistance R3 set based on a scaling factor, K, relative to the odd characteristic impedance, $Z_{ODD}$, of the interconnect 860.

During operation of the circuit 810, the transistor 838 acts like a pulsed current generator generating a pulse of amplitude IOS/2 and sets the load current overshoot amplitude at IOS. In the write driver 510 of the present invention, the transistor 530 acts similarly even when the overshoot current IOS/2 flows additionally through capacitor 538 and additional transistor 544. The output voltage, $V_{HWX}$, produced by driver circuit 810 and produced by driver circuit 510 with boost circuit 512 both show a pulse behavior of a duration, $2T_D$, and an amplitude equal to $Z_{ODD}$·IOS/2 as long as the output impedance is maintained of the write driver is maintained equal to the odd character impedance, $Z_{ODD}$, of the interconnect 560, 860. However, the prior art circuit 810 is not configured to maintain the desired output resistance.

Specifically, when the amplitude, IOS/2, is high enough to push the output voltage, $V_{HWX}$, to an amplitude of VCC–$VOV_{M1}$ (where $VOV_{M1}$ is the overdrive voltage of transistor M1 or transistor 838), the transistor 838 of the circuit 810 enters triode condition. The overshoot branch then presents a low output impedance that shunts the internal resistor 842 and reduces the total output impedance of the driver 810 to a lower value than the odd characteristic impedance, $Z_{ODD}$, of the interconnect 860. This results in the undesirable consequence of mismatched impedance between the driver 810 and the interconnect 860 or the output resistance of the driver 810 is "sub-matching" the characteristic impedance of the interconnect 860.

An important effect of this sub-matching condition in write driver 810 is a reduced output dynamic (or smaller voltage swing). Consequently, the write driver 810 also has a reduced peak current driving capability during these operating periods when compared with the write driver 510 that implements the boosting circuit 512. More particularly, the increased dynamic given to capacitor node 536 of the present invention allows the transistor 530 that acts as a pulsed current generator to work in saturation for an output voltage swing (i.e., a value up to or approaching the value given by Equation 1) exceeding the limit (i.e., VCC–$VOV_{M1}$) experienced by the write driver circuit 810. As can be appreciated, the larger output voltage swing achieved by the write driver 510 significantly improves the peak current performance for the write driver 510 when compared to other embodiments of write drivers, such as write driver 810.

To clarify the differing operation of the circuits 510 and 810, FIG. 9 illustrates graphically a qualitative comparison for a given load. Graphs 910, 920, 930, and 940 illustrate the values of load currents and output voltages over time produced by the circuits 510 and 810, with graphs 910 and 920 providing data for the circuit 810 and graphs 930 and 940 providing data for the circuit 510 of the present invention. All the curves are normalized in percentage to the maximum value obtained by the present invention, with the effect of the saturation of the overshoot current branch in circuit 810 being visible at high current overshoot settings.

As shown, a single step has been simulated for both circuits 510, 810 with a set of four overshoot currents with linearly increasing amplitudes (IOS/2). The effect of the sub-matching in circuit 810 is clearly visible at high overshoot current settings as a shortcoming in the voltage and current launched by the driver, i.e., compare graph 910 to graph 930 and graph 920 to graph 940. The improvement shown in FIG. 9 in the output dynamic range with circuit 510 is in agreement with improvements predicted by Equation 2.

Figure 10A:
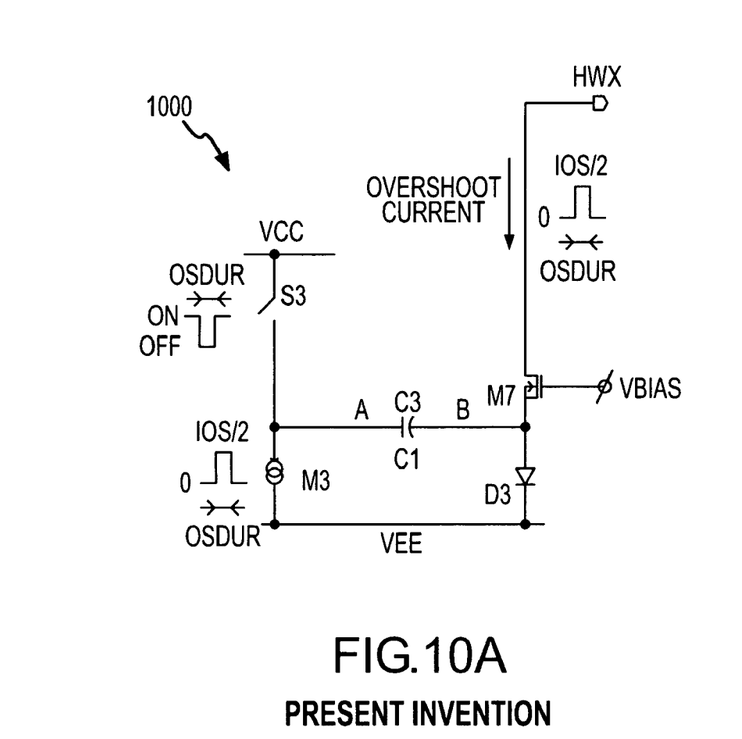
FIGS. 10A and 10B illustrate a boost circuit for write drivers according to the present invention and another prior art write driver circuit, respectively, drawn similarly to facilitate comparison.
Figure 10B:
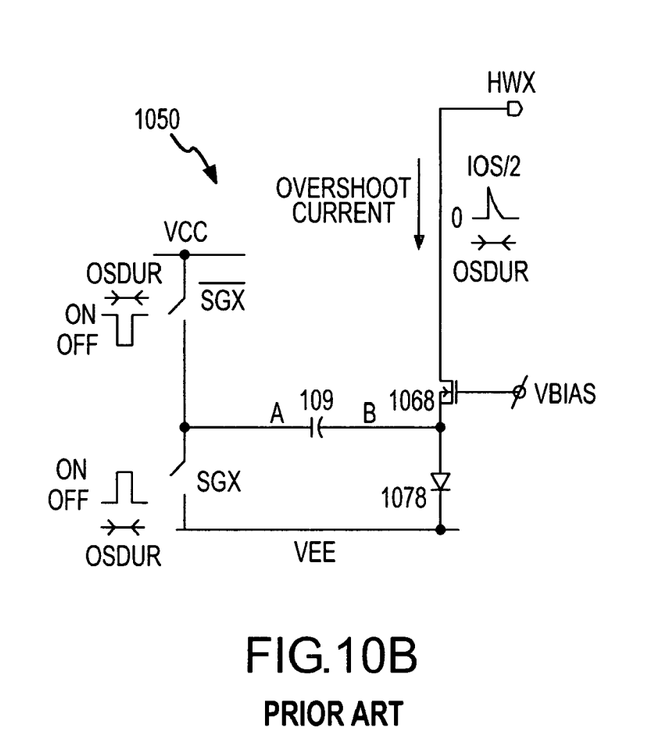

FIG. 10A illustrates the boosting techniques of the present invention in a write driver circuit 1000, and FIG. 10B illustrates a circuit 1050 exemplary of the teaching of U.S.

Pat. No. 6,512,645 entitled "Circuit and Method for Writing to a Memory Disk with a Boosted Voltage" issued Jan. 28, 2003 to Patti et al. The two circuits 1000, 1050 are represented in similar, simplified form to facilitate a clearer understanding of the differences between the two circuits. Circuit 1050 is a basic bootstrap circuit configured in an attempt of providing boosting to enhance the output voltage dynamic in a write driver (not shown), and in the following discussion, only pull-down techniques are compared as pull-up boosting circuitry is not described fully in the Patti et al. patent.

A major difference between the circuits 1000, 1050 is the way in which node A is driven. In circuit 1050, low impedance voltage drive is used while in the circuit 1000 high impedance current drive is utilized. As a consequence, the voltage integration occurs at node B in circuit 1050 but at node A in the circuit 1000 according to the present invention. Since the gate of transistor 1078 in circuit 1050 is kept at a fixed potential during operation of the circuit 1050, the related voltage, $V_{gs}$, of the circuit 1050 decreases during the overshoot transient due to the integration effect. As a result, the overshoot current is undesirably decreased accordingly.

In contrast, during operation of the circuit 1000, the overshoot current is constant as long as transistor M3 remains in saturation. This saturation condition for the transistor M3 can easily be satisfied for the entire duration of the overshoot, OSDUR, by properly sizing the capacitor C3. When the size of transistor 1078 of circuit 1050 and the size of transistor C3 of circuit 1000 are chosen to have the same overshoot current amplitude IOS/2 at the beginning of the transition and the two capacitors 109 and C3 have the same size, the two overshoot currents generated by the respective circuits 1050, 1000 shows the qualitative profile shown in FIGS. 10A and 10B. As shown, the circuit 1000 of the present invention produces a cleaner step response. Additionally, for high overshoot current amplitudes, the circuit 1050 will show a sub-matching condition (as discussed with reference to driver 810 of FIG. 8) during the overshoot. This is because the circuit 1050 has low impedance at node A. In contrast, the circuit 1000 of the present invention always provides impedance matching because the circuit 1000 shows high impedance at node A avoiding in this manner the propagation of reflected waves through the interconnect connected at output node HWX.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention as hereinafter claimed.

We claim:

1. A write driver circuit for driving current through a write head in a hard disk system, the driver being adapted to have an improved output dynamic range, the write driver comprising:
    an output node for connecting with an interconnect to the write head;
    means for receiving a supply voltage;
    a current generator connected to the supply voltage receiving means and generating a pulsed current; and
    a capacitance device with an input node and an output node, the input node being connected to the current generator and the capacitance device output node being connected to the write driver circuit output node, whereby the pulsed current flows through the capacitance device to the write driver circuit output node;
    wherein the pulsed current is generated for a period of time equal to an overshoot duration and wherein the capacitance device is sized to avoid saturation of the current generator during the time period.

2. The write driver circuit of claim 1, further comprising means for receiving a charging voltage and means for selectively applying after an overshoot duration the charging voltage to the input node of the capacitance device to pre-charge the capacitance device.

3. The write driver circuit of claim 1, wherein the capacitance device comprises a capacitor with a size large enough to avoid saturation of the current generator during the time period.

4. The write driver circuit of claim 1, further comprising a transistor connected to the output node of the capacitance device and in series with the current generator and a diode connected to the output node of the capacitance device and the supply voltage receiving means.

5. The write driver circuit of claim 4, wherein the capacitance device comprises a capacitor, the diode comprises a forward bias diode, and the current generator comprises a MOS transistor in current mirror configuration, wherein the diode periodically enters forward bias to recharge the capacitor and periodically enters reverse bias allowing the output node to swing above the supply voltage.

6. The write driver circuit of claim 1, further comprising an impedance matching circuit connected to the output node of the write driver circuit, the impedance matching circuit having a resistance substantially equal to the odd character impedance of the interconnect.

7. The write driver circuit of claim 6, wherein the impedance matching circuit further comprises a resistor and means for generating a voltage pulse to the resistor, the voltage pulse having an amplitude substantially equal to an output voltage at the output node of the write driver circuit, whereby the pulsed current is blocked from flowing through the resistor.

8. A write assembly for a hard disk drive storing data on a disk, comprising:
    a write head with a coil writing data to a surface of the disk in response to a write current passing through the coil;
    an electrical interconnect connected to the write head coil, the interconnect comprising a transmission line having an odd characteristic impedance; and
    a write driver with an output node connected to the interconnect, the write driver generating a pulsed current to drive the write current through the coil,
    wherein the write driver comprises a boosting circuit comprising means for receiving a supply voltage having a first amplitude and means for boosting the supply voltage to apply an output voltage at the output node with a second amplitude greater than the first amplitude;
    wherein the write current has an amplitude about twice an amplitude of the pulsed current;
    wherein the write driver comprises an impedance matching circuit setting an output resistance of the write driver to about the odd characteristic impedance of the interconnect;
    wherein the boosting means comprises:
    a first and a second node for receiving a supply voltage;
    a current generator connected to the first node adapted to generate the pulsed current; and a capacitor with an input node and an output node, the input node connected to the current generator and the capacitor output node connected to the write driver output node, whereby the pulsed current flows through the capacitor to the write driver output node;

wherein the boosting circuit further comprises a transistor connected to the capacitor output node and in series with the current generator and further comprising a diode connected to the capacitor output node and to the second node, the diode being forward biased toward the capacitor output node and adapted to periodically apply a voltage to the capacitor output node; and wherein the current generator comprises a transistor operated for an overshoot duration to provide the pulsed current;

wherein the amplitude of the pulsed current is substantially constant during the overshoot duration; and wherein the capacitor has a size selected to maintain the current generator transistor from saturation during the overshoot duration.

9. A write driver for selectively providing a write current through a write head, the write driver being connected to the write head by an interconnect with an odd characteristic impedance, the write driver comprising:

an impedance matching device connected to the interconnect comprising a resistance device setting an output resistance of the write driver equal to the odd characteristic impedance of the interconnect and selectively activated to generate a voltage pulse to an input of the resistance device with an amplitude equal to an output voltage of the write driver and a duration equal to a predetermined time; and a voltage boosting device connected between the interconnect and a high voltage reference, the voltage boosting device operating for a duration equal to the predetermined time to generate a pulsed current with an amplitude of about half an amplitude of the write current and comprising a current generator connected to the high voltage reference generating the pulsed current and a capacitance device connected between an output of the current generator and the interconnect.

10. The write driver of claim 9, wherein the current generator comprises a transistor maintained out of saturation during the operating period.

11. The write driver of claim 10, wherein the voltage boosting device is further selectively connected after completion of the operating period to a low voltage reference to charge the capacitance device.

12. The write driver of claim 9, wherein the voltage boosting device further comprises a transistor connected to an output node of the capacitance device and in series with the current generator and further comprises a diode connected to the output node of the capacitance device and the supply voltage receiving means.

13. The write driver of claim 12, wherein the capacitance device comprises a capacitor, the diode comprises a forward bias diode, and the current generator comprises a MOS transistor in current mirror configuration.

14. The write driver of claim 13, wherein the diode periodically enters reverse bias during the operating period of the voltage boosting device and applies a diode voltage to the output node of the capacitance device.

15. A write driver circuit for driving current through a write head in a hard disk system, the driver being adapted to have an improved output dynamic range, the write driver comprising:

an output node for connecting with an interconnect to the write head;

means for receiving a supply voltage;

a current generator connected to the supply voltage receiving means and generating a pulsed current;

a capacitance device with an input node and an output node, the input node being connected to the current generator and the capacitance device output node being connected to the write driver circuit output node, whereby the pulsed current flows through the capacitance device to the write driver circuit output node;

an impedance matching circuit connected to the output node of the write driver circuit, wherein the impedance matching circuit comprises a resistor having a resistance substantially equal to the odd character impedance of the interconnect and wherein the impedance matching circuit further comprises means for generating a voltage pulse to the resistor, the voltage pulse having an amplitude substantially equal to an output voltage at the output node of the write driver circuit, whereby the pulsed current is blocked from flowing through the resistor.

16. The write driver circuit of claim 15, further comprising means for receiving a charging voltage and means for selectively applying after an overshoot duration the charging voltage to the input node of the capacitance device to pre-charge the capacitance device.

17. The write driver circuit of claim 15, wherein the pulsed current the capacitance device for a period of time equal to an overshoot duration and wherein the capacitance device comprises a capacitor with a size large enough to avoid saturation of the current generator during the time period.

18. The write driver circuit of claim 15, further comprising a transistor connected to the output node of the capacitance device and in series with the current generator and a diode connected to the output node of the capacitance device and the supply voltage receiving means.

19. The write driver circuit of claim 18, wherein the capacitance device comprises a capacitor, the diode comprises a forward bias diode, and the current generator comprises a MOS transistor in current mirror configuration, wherein the diode periodically enters reverse bias and applies a diode voltage to the output node of the capacitance device.

* * * * *